Jan. 15, 1935.  C. OPOLO  1,987,791
STEERING WHEEL SUSPENSION AND STEERING MECHANISM
Filed April 9, 1934   2 Sheets-Sheet 1
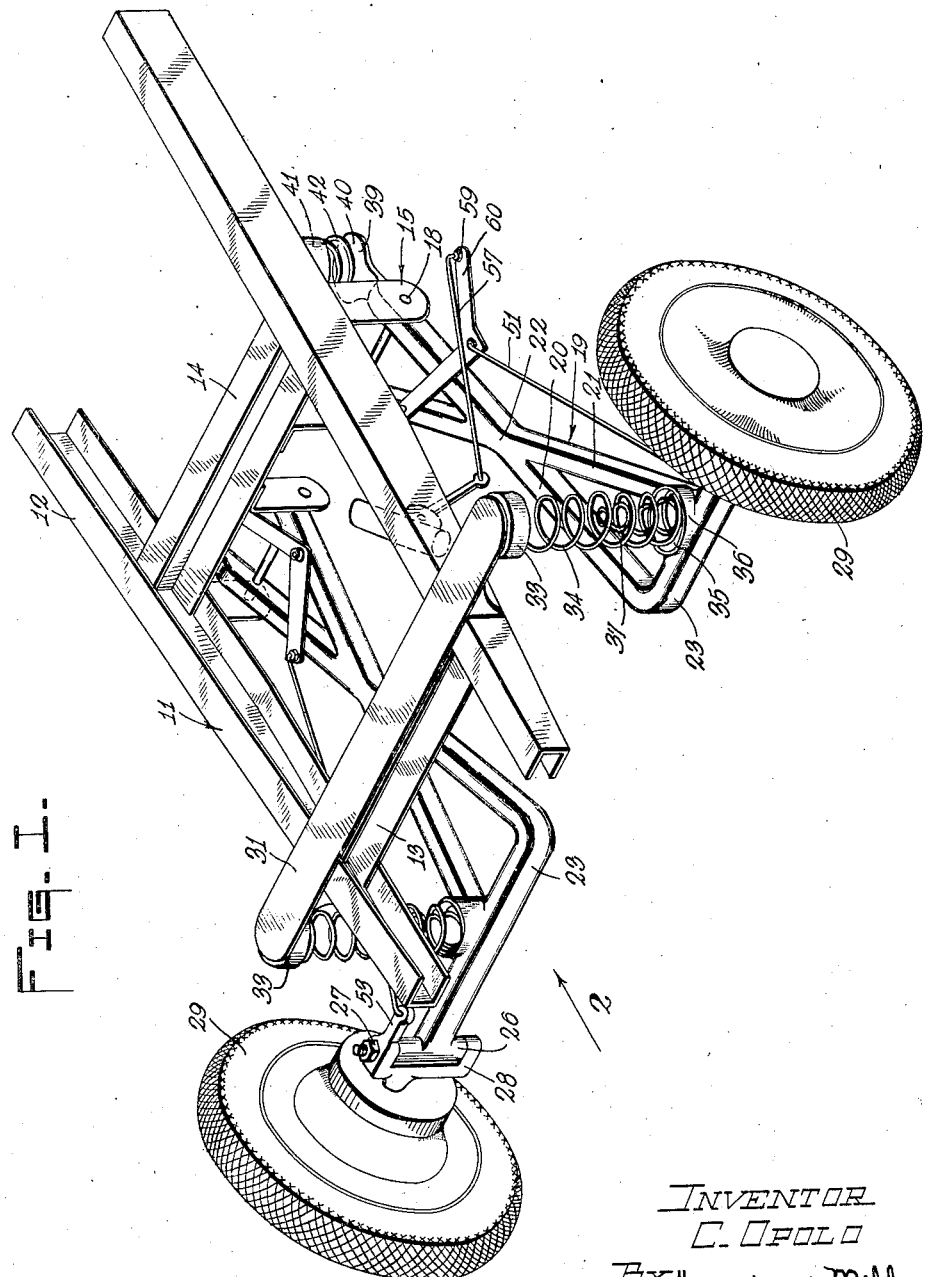
INVENTOR
C. OPOLO
BY Hazard and Miller
ATTORNEYS.

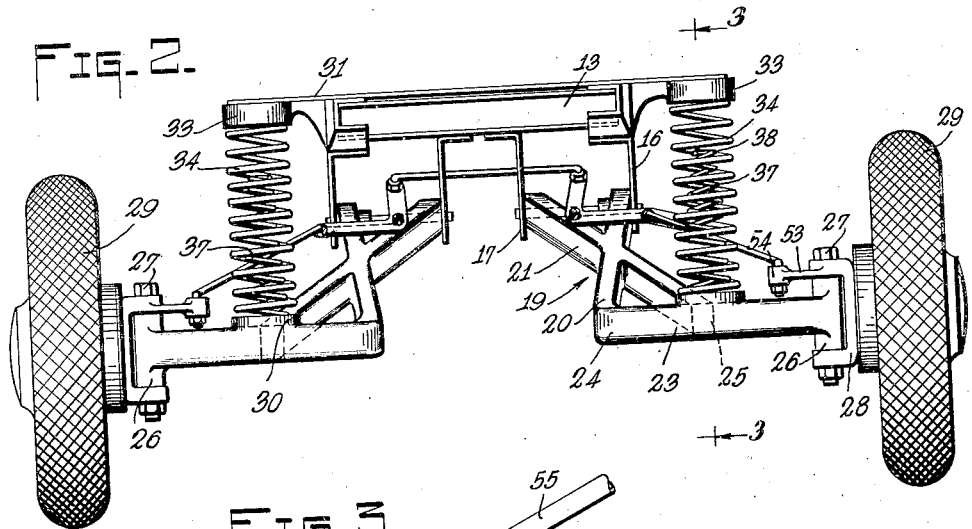
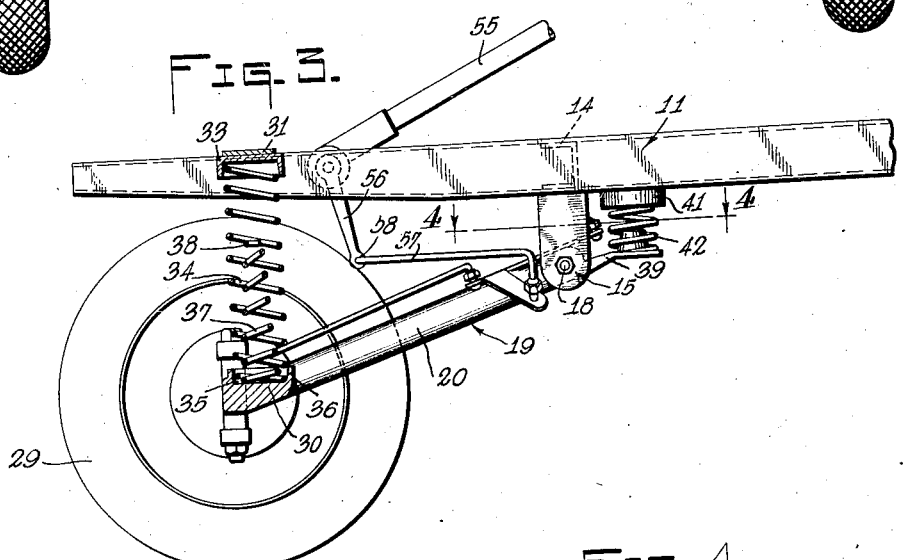
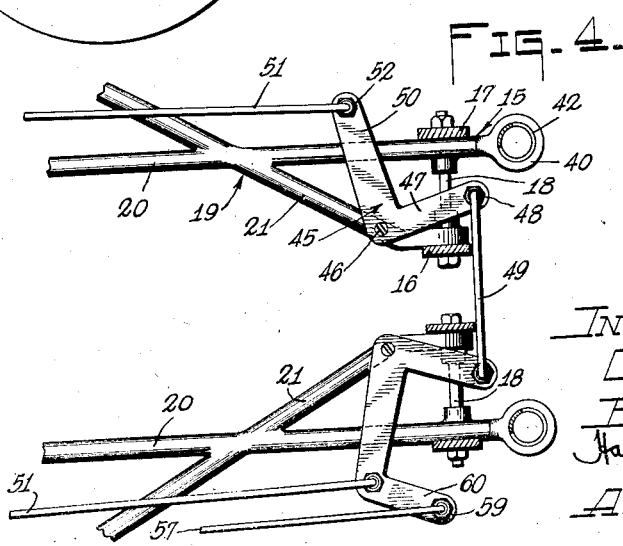

Patented Jan. 15, 1935

1,987,791

UNITED STATES PATENT OFFICE 1,987,791

STEERING WHEEL SUSPENSION AND STEERING MECHANISM

Charles Opolo, Culver City, Calif.

Application April 9, 1934, Serial No. 719,721

3 Claims. (Cl. 280—124)

My invention relates to an independent spring mounting of the steering wheels of a vehicle and an interlinking of the steering mechanism for both of the wheels with the independent spring suspension.

My invention, so far as it concerns the independent spring mounting of the steering wheels may be considered as a further development of my patent applications for Flexible axle for vehicles, filed March 10, 1934, Serial No. 714,971, and Double action axle, filed March 22, 1934, Serial No. 716,831, matured into Patent No. 1,978,114, dated Oct. 23, 1934.

An object and feature of my present invention as it concerns the spring mounting of the vehicle wheels consists in pivoting a longitudinally extended lever arm which is substantially parallel to the side beams of a vehicle frame to this vehicle frame and at the forward end of each lever arm to provide a part axle on which the steering road wheel is mounted by the usual spindle construction. The spring mounting comprises using an individual spring between the forward end of each lever arm and the forward portion of the vehicle frame. This may be a compression type of coiled spring.

Another feature of my invention is pivoting the lever arm intermediate its ends, that is, the rear end of the arm extends rearwardly of the pivot end and between this rear end and the vehicle frame there is a secondary spring. This may also be of the coiled compression type.

In this construction the pivots of the longitudinal levers are on the same transverse line, preferably connected below a transverse member between the side rails or beams of the vehicle frame. In order to stiffen the longitudinal lever to resist side thrusts the pivot of each lever is made comparatively long compared with the transverse measurement of the vehicle frame and the lever is made up of a pair of angular braced bars forming with the pivot and the part axle practically two V-shaped truss members secured together at their apex. By this construction of the individually spring mounted lever arms each wheel can have a free up and down movement relative to the vehicle frame and to the ground without causing a reaction with the opposite wheel, thus one wheel may react to bumps or depressions in the road which the other wheel does not encounter and the spring mounting will react to the movement of the one wheel without causing the whole of the front part of the vehicle frame to have an up and down movement which is a characteristic of wheels mounted on a continuous front axle and this front axle being spring connected to the vehicle frame.

Another object and feature of my invention as it concerns the interlinking of the steering mechanism for each wheel is the employment of two bell cranks, each pivoted at its elbow or angle to a part of the longitudinal lever arm on which each wheel is mounted. The pivot is preferably positioned close to the transverse pivot mounting of each lever arm and the bell cranks on the opposite sides of the vehicle are connected together to operate in unison. The free end of each bell crank is connected, preferably by a link, to an arm attached to each wheel and causing the wheel to pivot on its vertical spindle or king pin.

In my invention the steering column may be mounted in the conventional manner on one side of the vehicle and through the medium of a worm and worm wheel with an arm may have a link connection to one of the bell cranks and thus when operating one bell crank to actuate both, these moving in the reverse direction so that the wheels will be steered to make the same directional turn and each wheel rotated the proper amount to guide the vehicle around a curve. By this construction of the interconnected steering mechanism either wheel of the vehicle may move up and down relative to the vehicle frame and still permit correct steering of the steering wheels on opposite sides of the vehicle.

My invention is illustrated in the accompanying drawings, in which:

Fig. 1 is a perspective view of the front part of a vehicle frame showing my wheel mounting and spring suspension.

Fig. 2 is a front elevation taken in the direction of the arrow 2 of Fig. 1.

Fig. 3 is a longitudinal section on the line 3—3 of Fig. 2 in the direction of the arrows.

Fig. 4 is a horizontal section on the line 4—4 of Fig. 3 in the direction of the arrows.

In the drawings the vehicle frame is designated by the numeral 11 and this is provided with side beams or rails 12 which have a front, transverse member 13 and a rearward transverse member 14. The side beams and the transverse members are illustrated as being constructed of channels.

Extending downwardly from the rear transverse member and also from each side beam there are two brackets 15, these having outside and inside ears 16 and 17. Connecting these ears in each bracket there is a pivot rod 18.

Pivotally mounted on each pivot rod there is a lever arm assembly 19 which extends forwardly. This lever arm has a longitudinal lever member

20 which is pivoted preferably adjacent the ear 16 and a diagonal brace member 21 which is preferably pivoted adjacent the inner ear 17. The lever member and the brace member intersect at 22. At the forward end of the lever arm assembly there is a part axle 23 which is secured at its inner end 24 to the forward end of the longitudinal lever 20 and is engaged at an outside portion 25. The outer end of the axle portion is provided with a hub 26, through which extends the spindle or king pin 27, this latter holding the yoke 28 of the wheel axle, not illustrated, on which steering road wheels 29 are mounted. These wheels may be secured in an ordinary manner.

The spring mounting comprises a spring seat 30 on each axle portion. A transverse bar 31 extends across the vehicle frame vertically above the forward transverse member 13 and is secured thereto by welding. This plate at its ends has a pair of spring seats 33. These are located outside of the longitudinal beams or rails 12 and vertically above the spring seat 30. A stiff coiled compression spring 34 engages both of the seats 30 and 33. These seats are preferably formed in the manner of a socket indicated at 35 having a rim 36 for holding the ends of the main compression springs 34 in place. In addition to the spring 34 there is an internal coiled spring 37 mounted in the seat 30 and enclosed by the spring 34. This spring 37 is preferably a combined helically coiled and spiral spring and is smaller at the top than at the bottom. The top 38 terminates below the normal position of the upper spring seat 33. The longitudinal lever arm 20 is illustrated as having a rear extension 39 and this extension has a spring seat 40 complementary to which there is a spring seat 41 secured to the under side of each longitudinal beam or rail 12 preferably located closely contiguous to the bracket 16. An auxiliary coiled spring 42 fits between the seats 40 and 41.

The action of the spring mounting is as follows:
If both of the front wheels meet a bump or hump in the road manifestly both lever arms 19 will pivot on their pivot rod 18, causing a relative lifting of the axle ends 23 in reference to the front of the vehicle frame. This causes a compression of the main coil springs 34 and releases the compression on the spring 42. If the compression of the spring 34 is very severe the upper end 38 of the inner spring 37 engages the upper spring seat 33 and increases the resistance to the compression of the springs. The rebounding of these springs 34 and 37 forcing the front wheel assembly and the vehicle frame apart causes a compression of the rear springs 42 between the rear end of the lever arm 19 and the vehicle frame.

If the front wheels both strike a depression in the road the wheels and the front axles tend to move downwardly, thus decreasing the compression of the springs 34 but increasing the compression of the springs 42 thereby reacting against the tendency of the front end of the vehicle to drop into the depression.

If only one wheel on one side strikes a bump while the other wheel travels on a level road, on account of each lever arm assembly 19 being free to move independently of the other this will cause the front axle part to swing upwardly compressing the main spring 34, as above described, for the action of both wheels, but either wheel assembly may act independently of the other wheel assembly. The reverse action takes place when one wheel drops into a depression in the road while the other wheel follows a level road, the spring 34 on one side extending and the lever arm on one side pivoting downwardly independent of the action on the other side of the vehicle and thus tending to maintain the vehicle frame on a continuous level movement relative to the smooth part of the road.

The compensating steering mechanism for the vehicle wheels is as follows:

There are two bell cranks 45; each has its elbow 46 pivoted to the brace 21 by a vertical pivot preferably closely contiguous to the ear 17 of the bracket 15. The arms 47 of each of these bell cranks are connected at their outer ends 48 by a transverse link 49, this being for the purpose of actuating both of the bell cranks simultaneously but in the opposite direction. The opposite arms 50 of each of these bell cranks each have a forwardly extending link 51 pivoted at it outer end 52. These links at their forward ends each connect to an arm 53 attached to the yoke 28 by means of vertical pivots 54. Thus when each bell crank is operated it either pulls or thrusts on a link 51 and this turns the vehicle wheels 29 on their spindles or king pins 27. Thus both of the wheels are turned in the same direction to make the same directional turn of the vehicle.

In order to operate the bell cranks the vehicle is provided with a steering column 55 which has any suitable operating mechanism for actuating a lever arm 56. This may be of a standard type. A link 57 is pivotally connected to the lower end 58 of this arm and is pivoted to the outer end 59 of an extension arm 60 of one of the bell cranks, this extension being from the end 52 to which the link 51 is connected. Therefore, when there is a pull or a thrust on the link 57 it actuates the bell crank on one side of the vehicle, this being illustrated as on the left side when facing forward and by the medium of the transverse link 49 the motion is communicated to the opposite bell crank.

On account of the bell cranks being connected to the lever arm assemblies 19 closely contiguous to their pivot rods 18 there is comparatively little up and down movement to the bell cranks compared with the movement of the axle ends 23 and, hence, of the arms 53 and the vertical pivots 54. Thus one of the wheels with its part axle 23 may move up or down in reference to the vehicle frame without causing a binding action of the bell crank connected to the relatively moving lever arm 19 and thus the vehicle wheels may be readily steered even if only one is reacting to bumps or depressions in the road. Manifestly, if both wheels and their axle parts react simultaneously to bumps or depressions in the road relative to the vehicle frame there is no change in the relative position of the bell crank and these may be used to steer the vehicle under such condition.

Various changes may be made in the details of construction by those skilled in the art without departing from the spirit or scope of my invention as defined in the appended claims.

I claim:

1. In a vehicle, a vehicle frame having side members, a bracket structure depending from the frame, a pair of forwardly extending lever arm assemblies each having an arm substantially below a side member of the frame and a diagonal brace intersecting the arm, the rear end of each arm and each brace being connected to the bracket by a transverse hinge, the two hinges being in transverse axial alignment, an axle section secured to the forward end of each arm and brace and transverse to the vehicle frame, a wheel mounted on a spindle on each axle section and having a yoke arm for purposes of steering, each axle section having a spring seat, a complementary spring seat secured to the vehicle frame, a spring between each pair of seats, a bell crank pivoted to each lever arm assembly adjacent its hinge, a connecting link between the two bell cranks, a link connecting each bell crank and the yoke arm of a wheel, and a steering means to actuate one bell crank.

2. In a vehicle, a vehicle frame, a pair of forwardly extending lever arm assemblies each hinged to the under side of the vehicle frame, the said hinges being in transverse axial alignment, each lever arm assembly having an axle section extending transverse to the vehicle frame and each axle section having a wheel mounted thereon on a spindle and each wheel having a yoke arm for purposes of steering, a main spring between each lever arm assembly at its forward portion and the vehicle frame, a rearward extension on each lever arm assembly and an auxiliary spring between each extension and the vehicle frame, a bell crank pivoted to each lever arm assembly adjacent its hinge, a link connecting the two bell cranks, a link from each bell crank to the yoke arm of a wheel and a steering means connected to one bell crank to actuate both bell cranks and the several links simultaneously.

3. In a vehicle, a vehicle frame having two forwardly converging side members, a transverse member joining the side members, a pair of brackets extending downwardly from the transverse member, a lever arm assembly hingedly connected to each bracket at its rear portion, each assembly having a forwardly extending arm located substantially below one of the side members of the vehicle frame and having a diagonal brace, an axle section secured to the forward end of each arm and each brace, the axle sections being transverse to the axis of the vehicle frame, a wheel mounted on a spindle at the end of each axle arm and having a yoke arm for steering, a bell crank pivoted at its angle to the rear portion of each diagonal brace, each bell crank having a rearwardly extending arm, a link connecting said latter arms, each bell crank having an outwardly extending arm, a link between each outwardly extending arm and the said yoke arm of a wheel, one of the bell cranks having a rearwardly extending arm from the outwardly extending arm and a link connected to said extension adapted for operating both bell cranks and steering the wheels in unison.

CHARLES OPOLO.